W. A. SAWYER.
VEHICLE TIRE.
APPLICATION FILED AUG. 13, 1909.

1,066,328.

Patented July 1, 1913.

WITNESSES:

INVENTOR
Wilson A. Sawyer
BY Frederick W. Cameron.
ATTY.

UNITED STATES PATENT OFFICE.

WILSON A. SAWYER, OF SARATOGA SPRINGS, NEW YORK.

VEHICLE-TIRE.

1,066,328.  Specification of Letters Patent.  Patented July 1, 1913.

Application filed August 13, 1909. Serial No. 512,635.

*To all whom it may concern:*

Be it known that I, WILSON A. SAWYER, a citizen of the United States, residing at Saratoga Springs, in the county of Saratoga and State of New York, have invented certain new and useful Improvements in Vehicle-Tires, of which the following is a specification.

Figure 4:
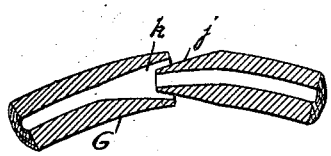
Figure 1:
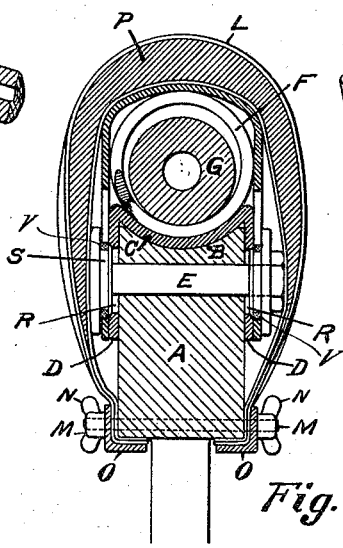
Figure 5:
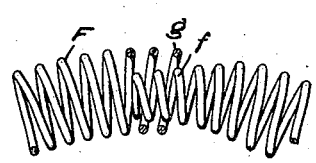
Figure 2:
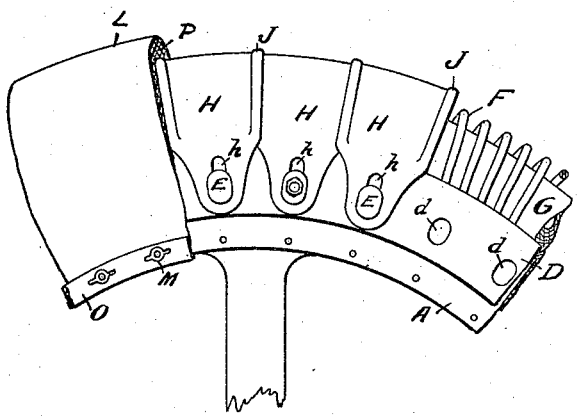
Figure 3:
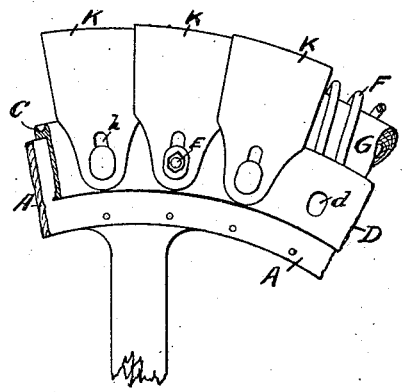

My invention relates to vehicle tires, and the object of my invention is to provide a non-inflated, puncture-proof tire, particularly adapted for use in automobiles, together with such elements and combinations as are hereinafter more particularly set forth and claimed. I accomplish these objects by means of the mechanism illustrated in the accompanying drawings, in which:

Figure 1 is a cross section. Fig. 2 is a side elevation with parts broken away. Fig. 3 is a side elevation of a modified form of my invention. Fig. 4 is a plan, with parts broken away, of the rubber hose showing telescopic connection. Fig. 5 is a plan, with parts broken away, of the spiral spring showing means for telescoping the same.

Similar letters refer to similar parts throughout the several views.

The felly, A, of a wheel is provided with a grooved or concaved periphery, B, which forms the seat for a correspondingly grooved annular frame provided with concavo-convex portion, C, and downwardly projecting portions, D, D, which engage the sides of the felly, A, provided with a series of bolt holes, *d*, *d*, through which bolts, E, E, may be passed and through corresponding holes in the felly whereby the frame will be held securely in position on the felly A. In contact with the concave face, C, of the annular frame I place a spiral spring, F, which may have within its coils a rubber hose, G. About the spring I place a series of holding plates, H, which are provided with elongated openings, *h*, through which the bolts, E, pass. The elongated openings permit of a movement of the holding plates on said bolts. The holding plates, H, may overlap and be beaded along the overlapping portions, whereby dirt and dust is prevented from entering into contact with the spring and rubber.

I have shown in Fig. 3 holding plates, K, K, which over-lap at their sides, but which are not provided with the bead. This is a modified form, but comes within the scope of my invention.

The spring, F, has one end, *f*, constructed of smaller diameter than the other end, *g*. The end, *f*, being inserted within the larger end, *g*, so that when pressure is brought upon the spring the small end may be forced into the larger end. In the same manner I have arranged the rubber tube, G, so that the end, *j*, may enter the end, *k*, when pressure is applied to the wheel.

For the purpose of covering the tire and deadening the noise which might be occasioned by the holding plates, H, engaging the stones or other surface, I may place a raw-hide or other suitable covering, L, which envelops the holding plates, their connections with the felly and is secured to the felly, preferably, by means of bolt M with thumb screw N and angle bars O, O.

I generally place on the under side of the raw-hide covering, L, a filling, P, which acts as a resilient cushion and coming as it does in contact with the ends of the bolts, E, E, will tend to support the parts in relation to each other and the clicking noise occasioned by the holding plates moving on the bolts, E, will be minimized. I preferably construct the bolt, E, with elongated shoulders, R, which fit in the elongated openings, *d*, in the portion D of the frame, whereby the bolt is prevented from rotating. The shoulder, S, of the bolt, E, is also flattened or elongated, to correspond with the elongated opening, *h*, in the clamps H. In order to minimize the noise occasioned by the clamps moving on the bolts, E, E, I may place a rubber, spring or other device V on the shoulder S.

I do not want to limit myself to the use of raw-hide for a covering, or indeed to any covering at all, because any suitable material may be used instead of raw-hide and without a covering the tire is serviceable.

My improved tire may be applied to any wheel regardless of the material of which it is constructed or the form of the felly, since my device can be easily adjusted to fit any vehicle wheel.

What I claim as my invention and desire to secure by Letters Patent is:

The combination of a vehicle wheel provided with a grooved felly; an annular concavo-convex frame seated in said grooved felly; flanges on said frame adapted to engage opposite sides of the felly; a spiral spring placed in contact with the concave face of said frame; a series of slotted holding plates extending over said spring; a series of bolts passing through said felly and also through said frame and the slots in said holding plates; a covering placed over said holding plates and over said bolts; a means for securing said covering along its edges to said felly, substantially as described.

In testimony whereof I have affixed my signature in presence of two witnesses.

WILSON A. SAWYER.

Witnesses:
 LOTTIE PRIOR,
 FREDERICK W. CAMERON.

Copies of this patent may be obtained for five cents each, by addressing the "Commissioner of Patents, Washington, D. C."